United States Patent
Assow et al.

[11] Patent Number: 6,154,380
[45] Date of Patent: Nov. 28, 2000

[54] AC/DC BOOST CONVERTER

[75] Inventors: Bengt Assow; Kjell Rolleberg, both of Norsborg, Sweden

[73] Assignee: Telefonaktiebolaget LM Ericsson, Stockholm, Sweden

[21] Appl. No.: 09/242,704

[22] PCT Filed: Jul. 11, 1997

[86] PCT No.: PCT/SE97/01272

§ 371 Date: Feb. 19, 1999

§ 102(e) Date: Feb. 19, 1999

[87] PCT Pub. No.: WO98/08294

PCT Pub. Date: Feb. 26, 1998

[30] Foreign Application Priority Data

Aug. 22, 1996 [SE] Sweden .................................. 9603049

[51] Int. Cl.$^7$ .................................................. H02M 3/18
[52] U.S. Cl. .................................................. 363/61
[58] Field of Search ............................ 363/61, 59, 60; 315/209

[56] References Cited

U.S. PATENT DOCUMENTS

| 3,526,821 | 9/1970 | Thomas ........................................ 363/61 |
| 4,864,488 | 9/1989 | Bulmahn et al. ........................ 363/61 |
| 5,119,283 | 6/1992 | Steigerwald et al. ..................... 262/61 |
| 5,383,109 | 1/1995 | Maksimovic et al. . |
| 5,969,481 | 10/1999 | Konopka ............................. 315/209 R |

FOREIGN PATENT DOCUMENTS

92/22952 12/1992 WIPO .

*Primary Examiner*—Shawn Riley
*Assistant Examiner*—Gary L. Laxton
*Attorney, Agent, or Firm*—Burns, Doane, Swecker & Mathis, L.L.P.

[57] ABSTRACT

A voltage doubler rectifier circuit which can be switched to different mains voltages. The circuit includes two pairs of series-coupled diodes and respectfully arranged to form a full-wave rectifier. A first terminal of a coil is connected to the positive side of the full-wave rectifier, and a second terminal of the coil is connected to an anode of a fifth diode. The anode of a sixth diode is connected to a cathode of the fifth diode via two series-coupled capacitors, and a cathode of the sixth diode is connected to a further coil. A first terminal of a switching means is connected between the anode of the fifth diode and the second of the coil. A second terminal of the switching means is connected to a coil which is connected to the negative side of the full-wave rectifier. A switch is connected between the connecting line of the diodes in one of the diode-pairs in the full-wave rectifier and the line connecting the capacitors.

13 Claims, 2 Drawing Sheets

AC/DC BOOST CONVERTER

FIELD OF INVENTION

The present invention relates to an AC/DC boost converter that has a high power factor and that can be connected to different network or mains voltages.

BACKGROUND OF THE INVENTION

Traditional rectifier circuits in which energy is first stored in a capacitor that is charged to a peak voltage from a rectifier bridge have low power factors. These circuits also usually generate markedly distorted sinusoidal currents that are liable to cause disturbances in a connected public switched network. Various solutions to this problem have been proposed.

U.S. Pat. No. 5,383,109 teaches a rectifier circuit that has a high power factor. The circuit is constructed as a full-wave rectifier bridge for high mains voltages and as a voltage doubler for low mains voltages. Output voltage control and power factor correction are achieved with the aid of a high frequency booster circuit that includes two coils which are parallel-coupled at low mains voltages and series-coupled at high mains voltages. The circuit also includes two series-coupled transistors which function as pulse wave modulators.

One drawback with the aforedescribed circuit is that it includes double transistors and double switches, causing the circuit to be unnecessarily complicated.

SUMMARY OF THE INVENTION

The present invention solves, on the one hand, the problem of how the power and efficiency of a load coupled to an electric rectifying circuit shall be held constant irrespective of whether the alternating mains voltage takes one of two different values, e.g. either a value of 220V or a value of 110V, and, on the other hand, the problem of how an input current shall be able to assume a predetermined current curve.

Another problem is that in order to maintain constant load power values when the mains voltage assumes the aforesaid typical values for instance, certain circuit components must be dimensioned for very high energies and therewith become unnecessarily large and expensive.

The aforesaid problems are solved by means of the present invention with the aid of an improved electric rectifying circuit that includes a plurality of diodes, at least one coil, at least two capacitors, at least one selector switch, and at least one high frequency switch.

In one embodiment, two pairs of series-coupled diodes are arranged to form a full-wave rectifier. A DC voltage is applied to the full-wave rectifier at a connection point located in the connection line between the diodes of the one diode pair, and the other connection point is located between the diodes of the other diode pair. Two coils and the high frequency switch are coupled in parallel with the full-wave rectifier. One terminal of the first coil is connected to one DC-side of the full-wave rectifier that has the highest potential, the so-called positive side. One terminal of the other coil is connected to the other DC-side of the full-wave rectifier that has the lowest potential, the so-called negative side. The high frequency switch is coupled between the two coils such that a first terminal of the high frequency switch will be coupled to a second terminal of the first coil and a second terminal of the high frequency switch will be coupled to the other terminal of the second coil.

A fifth and a sixth diode and two capacitors are coupled in parallel with the high frequency switch. The anode of the fifth diode is coupled to the first coil, so that said first coil will sit between the positive side in the full-wave rectifier and said fifth diode. The cathode of a sixth diode is coupled to the second coil, so that the second coil will sit between the negative side in the full-wave rectifier and the cathode on the sixth diode.

Two series-coupled capacitors are disposed between the first and the second diode. One terminal or side of a switch is connected to the connecting line between the one diode-pair in the full-wave rectifier. The other terminal or side of the switch is disposed on the connecting line between the two capacitors.

In the case of a relatively high AC voltage, for instance 220V, the switch is open and the circuit operates in a so-called low boost mode. In the case of a relatively low AC voltage, for instance 110V, the switch is closed and the circuit operates in a so-called high boost mode or voltage doubling mode. The switch will preferably change mode, or state, automatically depending on the voltage to which the circuit is connected.

When the high frequency switch is conductive and the circuit operates in its high boost mode, current is taken from the mains voltage and stored in the two coils. When the high frequency switch is turned off, the magnetic energy in the coils is discharged and charges the capacitors. The pulse width of the high frequency switch is adapted so that the input current will assume a predetermined curve shape, for instance a sinusoidal shape.

When the high frequency switch conducts and the circuit operates in its low boost mode, the circuit functions as when in its high boost mode. When the high frequency switch is turned off, the magnetic energy is discharged from the first coil in one-half cycle period and charges the first capacitor. The magnetic energy is discharged from the other coil in the second-half cycle period and charges the second capacitor.

The described couplings enable the same energy to be converted in the high boost mode as in the low boost mode when the mains voltage in the high boost mode is twice as high as in the low boost mode.

When the same energy is converted in the low boost load, 220V, and the high boost mode, 110V, the current in the low boost mode must be twice as high as that in the high boost mode. This is achieved by increasing the conduction time of the high frequency switch to an appropriate value in the low boost mode.

The aim of the invention is to reduce the number of components and the size of the components required of an electric circuit for rectifying alternating voltages and capable of functioning between at least two different mains voltages, for instance 110V and 220V, and also to maintain constant circuit efficiency irrespective of which of the aforesaid mains voltages is used.

One advantage afforded by the present invention is that only one transistor is included in the circuit.

Another advantage afforded by the present invention is that the power factor is high.

The invention will now be described in more detail with reference to preferred embodiments thereof and also with reference to the accompanying drawings.

DETAILED DESCRIPTION OF PREFERRED EMBODIMENTS

Figure 1:
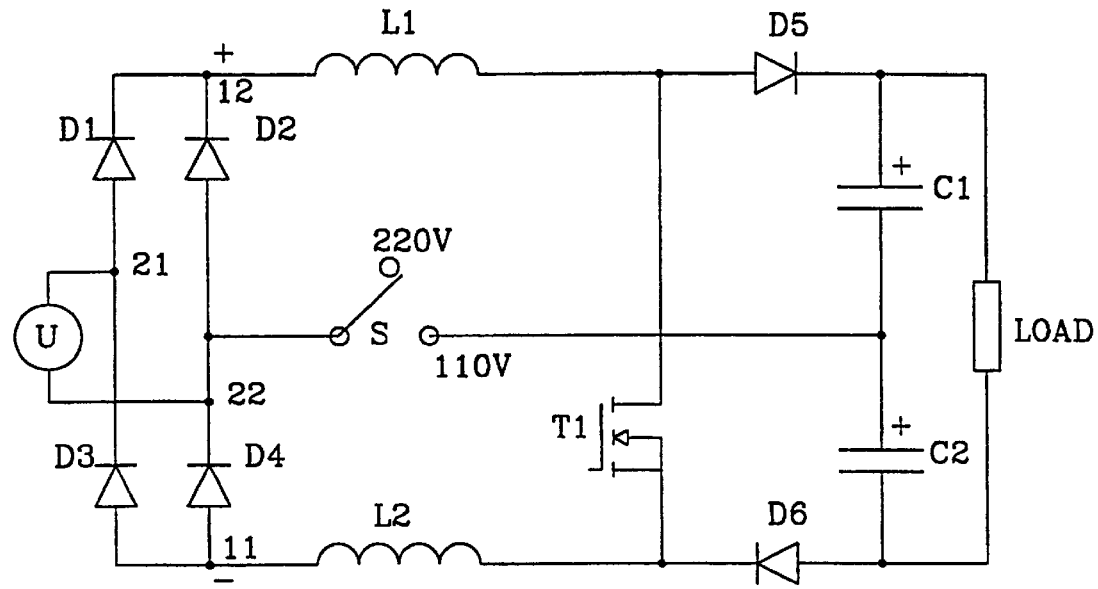
FIG. 1 illustrates a first embodiment of an inventive electric circuit.

Shown in FIG. 1 is a first embodiment of a voltage doubler rectifier circuit which can switch between variable mains voltages. The electric circuit includes two pairs of series-coupled diodes D1, D2 and D3, D4 respectively, which are combined to form a full-wave rectifier. The full-wave rectifier has a negative side 11 and a positive side 12 and is connected to a network alternating voltage U such that one contact point 21 on said mains voltage U is located on the connection line between the diodes of the first diode pair, and the second contact point 22 on the mains alternating voltage U is located on the connection line between the diodes of the second diode pair.

Two coils L1, L2 and a high frequency switch T1 are connected in parallel with the diode pairs of the full-wave rectifier. A first terminal of the first coil L1 is connected to the positive side 12 of the full-wave rectifier and a second terminal of said coil is connected to the high frequency switch T1, which is comprised of a transistor in the illustrated case. The high frequency switch T1 may alternatively comprise a component that has properties similar to those of a transistor. The second terminal of the first coil is connected to the transistor drain. The transistor gate and transistor source are connected to control means not shown in the Figure. The first terminal of the second coil L2 is connected to the negative side 11 of the full-wave rectifier, while the second terminal of said coil L2 is connected to the transistor source. The coils may either be separate from one another or mounted on one and the same core.

Two diodes D5, D6 and two capacitors C1, C2 are connected in parallel with the high frequency switch T1. The anode of the fifth diode D5 is coupled to the second terminal of the coil L1. The cathode of the sixth diode D6 is connected to the second terminal of the coil L2. Two series-coupled capacitors C1 and C2 are disposed between the cathode of the diode D5 and the anode of the diode D6.

One side of a switch S is connected to the connecting line between the diodes of one of the diode pairs D1, D3 or D2, D4. The other side of the switch is connected on the connecting line between the capacitors C1 and C2. The switch S of this embodiment alternates between two different states, the state of the switch being dependent on the mains or is network alternating voltage to which the circuit is connected, and will preferably switch automatically between its two different states in accordance with methods well known in this field.

When the circuit is connected to relatively high mains voltages, for instance 220V, the selector switch S is open and the circuit operates in a so-called low boost mode. The diodes D1, D2, D3 and D4 coact mutually to form a conventional full-wave rectifier. In its low boost mode or 220V mode, the inventive circuit functions as a so-called pump in accordance with known practice. When T1 is conductive, current is taken from the network or mains alternating voltage U via D1/D4 or D2/D3 and is stored in L1 and L2, which are then charged with magnetic energy. When T1 is switched off, the magnetic energy in L1 is discharged to C1 via D5, while the magnetic energy in L2 is discharged to C1 via D6. The pulse width on T1 is adapted at each point so that the input current can be shaped according to a desired curve form over one period. Assume that the input current is sinusoidal, the amount of energy transferred from L1/L2 to C1/C2 at the top of the sinusoidal curve will be small but the current at its highest. Both current and energy are low at the zero crossing of the sinusoidal curve. The highest power is transferred between these points.

Figure 2:
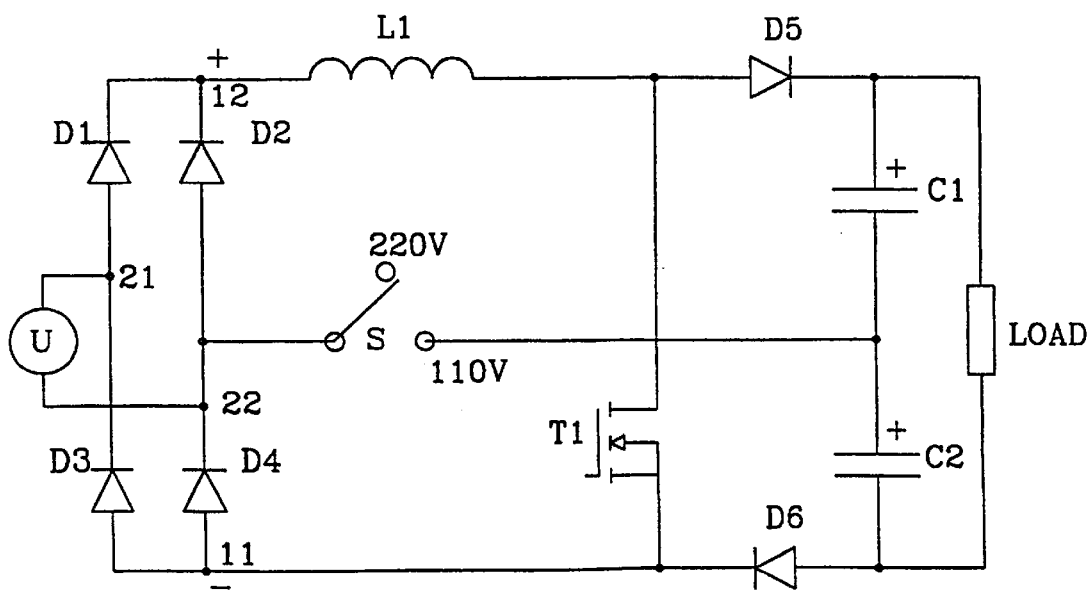
FIG. 2 illustrates a second embodiment of an inventive electric circuit.

FIG. 2 illustrates a second embodiment of an inventive voltage doubler rectification circuit which is able to switch states in dependence of a variable mains voltage. The electric circuit includes two pairs of series-coupled diodes D1, D3 and D2, D4 respectively, which are mutually connected to form a full-wave rectifier. The full-wave rectifier has a negative side 11 and a positive side 12. The full-wave rectifier is connected to a alternating mains voltage U such that one contact point 21 on the mains alternating voltage U is located on the connection line between the diodes of the first diode pair and the other contact point on the mains alternating voltage U is located on the connection line between the diodes of the second diode pair.

A coil L1 and a high frequency switch T1 are connected in parallel with the diode pairs of the full-wave rectifier. The first terminal of the coil L1 is connected to the positive side 12 of the full-wave rectifier, whereas the second terminal of said coil is connected to the high frequency switch T1. In the illustrated embodiment the high frequency switch is comprised of a transistor, although it will be understood that a component having corresponding properties may alternatively be used. In the illustrated case, the second terminal of the coil is connected to the transistor drain. The transistor is connected to the negative side 11 of the full-wave rectifier. The transistor gate and transistor source are connected to a control means, not shown in the Figure. Two diodes D5, D6 and two capacitors C1, C2 are connected in parallel with the transistor T1. The anode of the fifth diode D5 is connected to the second terminal of the coil L1. The cathode of the sixth diode D6 is connected to the negative side of the full-wave rectifier and also to the transistor source. Two series-coupled capacitors C1 and C2 are connected between the cathode of diode D5 and the anode of diode D6.

One side of a switch S is connected to the connecting line between the diodes of one of the diode pairs D1, D3 or D2, D4 of the full-wave rectifier. The other side of the switch is connected between the connecting line to the capacitors C1 and C2. The switch S of this embodiment switches between two different states, depending on the network alternating voltage to which the circuit is connected, said switch preferably switching automatically between said two states in accordance with methods well known in this field.

A pump of this kind will normally be dimensioned to charge a capacitor (C1+C2) to the same voltage as at 220V even when the input voltage is 110V. The disadvantage with a pump of this kind is that it is necessary to convert a large amount of energy and that the pump is commensurably large and expensive. Such pumps also have a low efficiency. The most energy is transferred at the top of the sinusoidal curve.

The inventive switchable pump converts the same amount of energy in the case of 110V as in the case of 220V. Only a small amount of energy is transferred at the top of the sinusoidal curve, as in the case of 220V, but since this energy is taken from 110V via D2/D3 or D1/D4, the current must be twice as high, which is achieved by increasing the conducting time of T1 to an appropriate value.

The electric circuit illustrated in FIG. 1 will also operate without the coil L2, although this will somewhat impair the performance of the circuit. The electric circuit may also include at least one current restricting resistor. The resistor may be placed with its one connection end between the cathode of the diode D6 and the second terminal of the coil L2. The other connection end of the resistor may be connected to the transistor T1.

Figure 3:
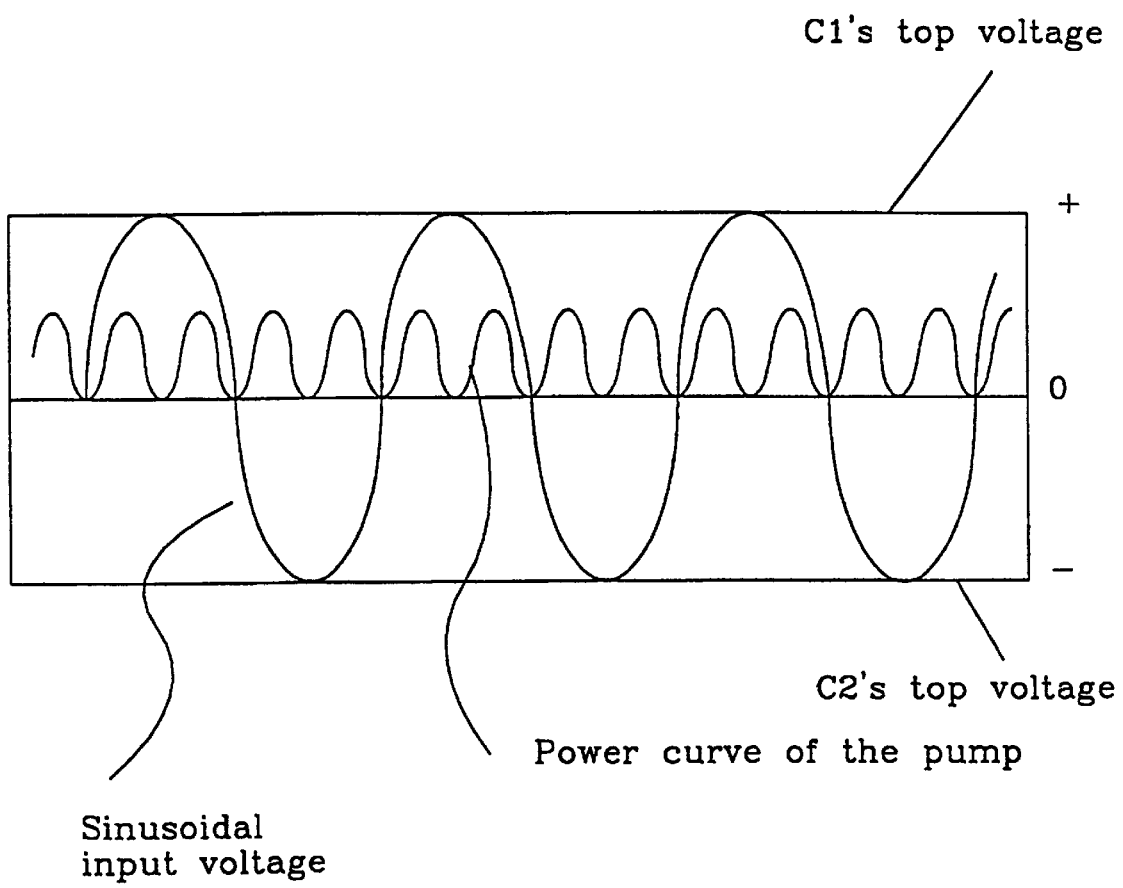
FIG. 3 shows a voltage curve for the circuit illustrated in FIG. 1.

FIG. 3 illustrates an example of the modus operandi of the pump and shows the configuration of the rectified voltage in the low boost mode of the circuit in FIG. 1.

It will be understood that the invention is not restricted to the aforedescribed and illustrated embodiments thereof and that modifications can be made within the scope of the following Claims.

What is claimed is:

1. A voltage doubler rectifier circuit which can switch to different mains voltages, the circuit comprising:
    a full wave rectifier including a positive side and a negative side, wherein the full-wave rectifier comprises two pairs of series-coupled diodes;
    a first coil connected at its first terminal to the positive side of the full-wave rectifier, and connected at its second terminal to an anode of a fifth diode;
    a sixth diode whose cathode is connected to the negative side of the full-wave rectifier and whose anode is connected to a cathode of the fifth diode via two series-coupled capacitors;
    switching means having a first terminal connected to the contact point between the second terminal of the first coil and the anode of the fifth diode, and a second terminal connected to the cathode of the sixth diode; and
    a switch connected between a connecting line to the diodes in one of the diode pairs of the full-wave rectifier and a line connecting the capacitors.

2. A circuit according to claim 1, further comprising:
    a second coil connected between the negative side of the full-wave rectifier and the cathode of the sixth diode.

3. A circuit according to claim 2, wherein the first coil and the second coil are mounted on a same core.

4. A circuit according to claim 1, wherein the switching means comprises a transistor.

5. A circuit according to claim 4, wherein a control means is connected to the gate and the source of said transistor.

6. An AC/DC boost converter that has a high boost mode and a low boost mode, the converter comprising:
    a high frequency switch, wherein in the high boost mode when the high frequency switch is conductive a current is taken from a mains voltage and stored in a first and second coil and when the high frequency switch is in a non-conductive state, magnetic energy in the first and second coils charges a first and second capacitor, respectively;
    wherein in the low boost mode, when the high frequency switch is conductive a current is taken from a mains voltage and stored in the first and second coils and when the high frequency switch is in a non-conductive state, the magnetic energy in the first coil is discharged in one-half cycle period and charges the first capacitor and the magnetic energy from said second coil, in the second-half cycle period charges the second capacitor.

7. An AC/DC boost converter in accordance with claim 6, wherein in the high boost mode a pulse width of the high frequency switch is adapted so that the input current has a predetermined curve shape.

8. A method for converting a signal from AC to DC comprising the steps of:
    storing current from a mains voltage in a first and second coil when a high frequency switch is in the high boost mode and the high frequency switch is conductive;
    charging a first and second capacitor with magnetic energy from the first and second coils, respectively, when the high frequency switch is in the high boost mode and the high frequency switch is in a non-conductive state;
    storing current from the mains voltage in the first and second coils when the high frequency switch is in a low boost mode and the high frequency switch is conductive;
    discharging the magnetic energy in the first coil in one-half cycle period and charging the first capacitor, and charging the second capacitor with the magnetic energy from said second coil in the second-half cycle period, when the high frequency switch is in a low boost mode and the high frequency switch is non-conductive.

9. A voltage doubler rectifier circuit to be switched between two different mains voltages, comprising:
    two pairs of series-coupled diodes configured as a full-wave rectifier bridge having a negative output terminal and a positive output terminal;
    a first coil connected between the positive output terminal of the rectifier bridge and an anode of a first diode;
    a first capacitor connected between a cathode of the first diode and a second capacitor;
    a second diode, wherein an anode of the second diode is connected to the second capacitor and a cathode of the second diode is connected to the negative output terminal of the rectifier bridge; and
    a switch for switching between the different mains voltages, interconnected between the interconnection point between the diodes of one of the diode pairs of the rectifier bridge and the interconnection point between the first and second capacitors;
    wherein a single high frequency switch is interconnected between the anode of the first diode and the cathode of the second diode.

10. A circuit according to claim 9, wherein;
    a second coil is interconnected between the negative output terminal of the rectifier bridge and the cathode of the second diode.

11. A circuit according to claim 10, wherein the first and second coils are mounted on a same core.

12. A circuit according to claim 9, wherein the high frequency switch is a transistor.

13. A circuit according to claim 12, wherein a control means is connected to the gate and the source of said transistor.

* * * * *